Figure 1:
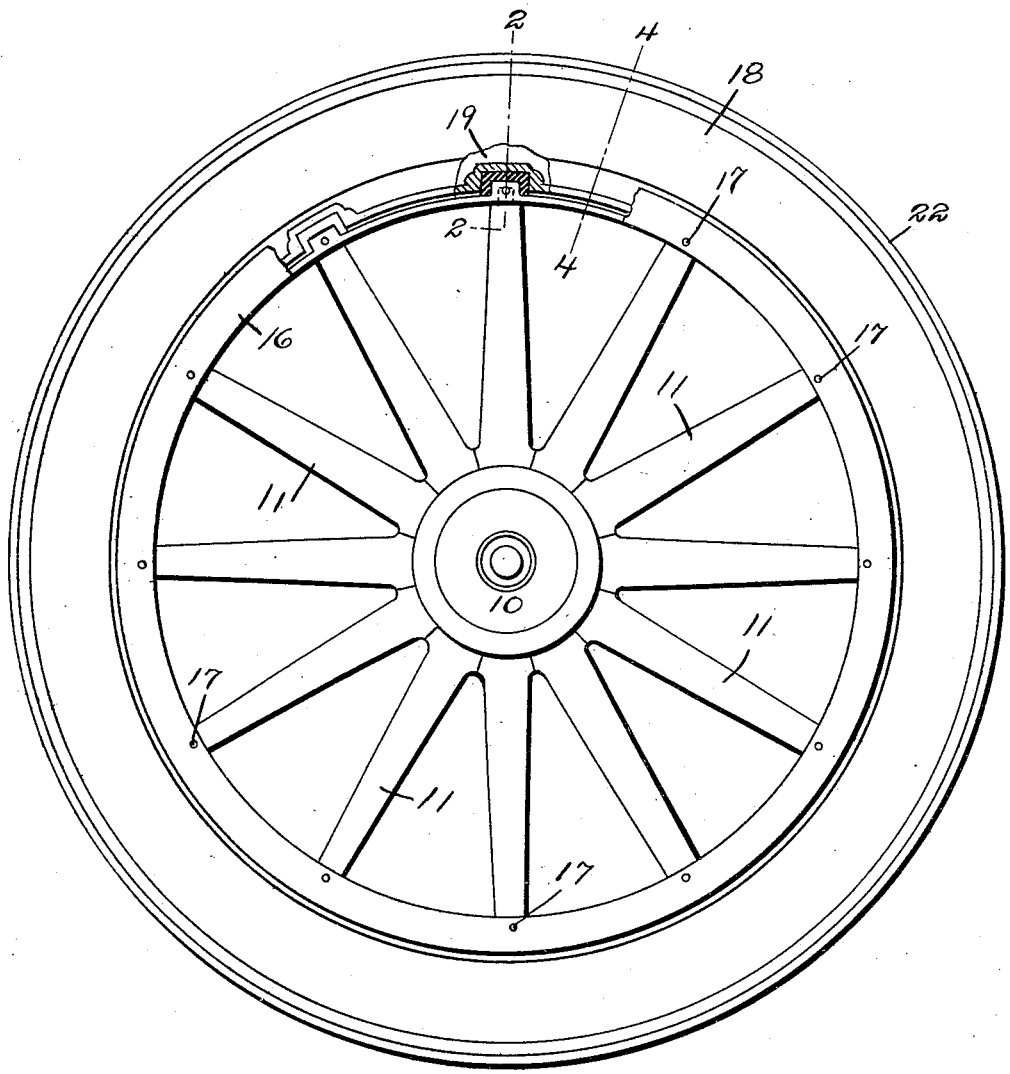

J. B. CRAWFORD & J. R. MILLIKEN.
METALLIC TIRE.
APPLICATION FILED JAN. 24, 1911.

1,005,607.

Patented Oct. 10, 1911.

2 SHEETS—SHEET 1.

Witnesses

Inventors
J. B. Crawford.
J. R. Milliken.

By
Attorneys.

J. B. CRAWFORD & J. R. MILLIKEN.
METALLIC TIRE.
APPLICATION FILED JAN. 24, 1911.
1,005,607.
Patented Oct. 10, 1911.
2 SHEETS—SHEET 2.
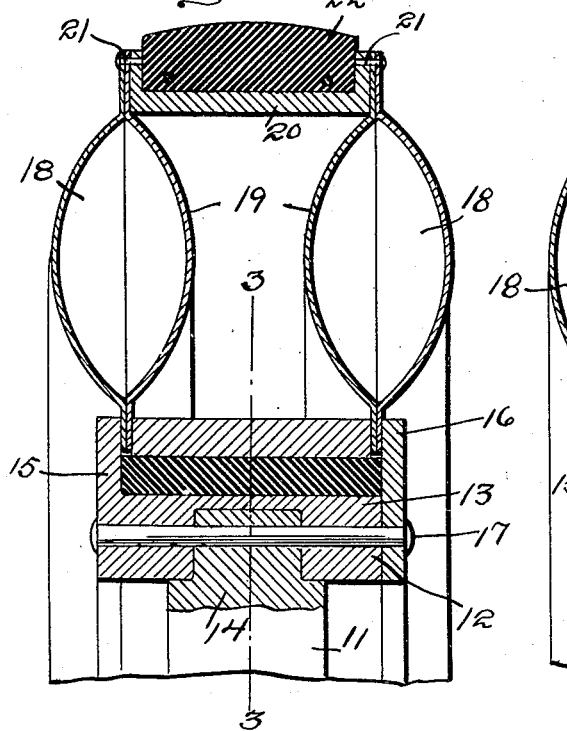
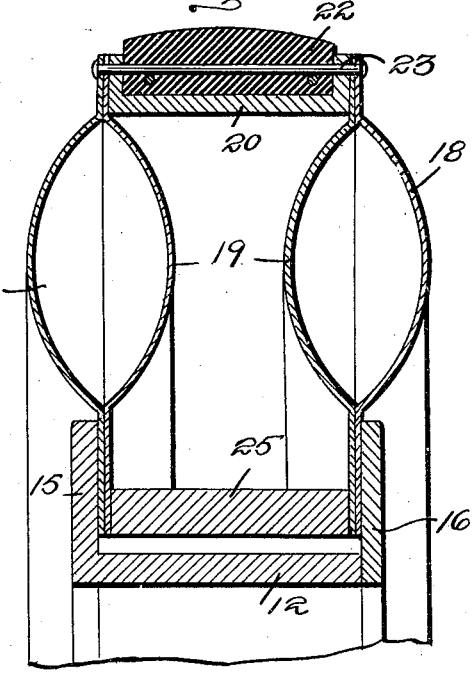
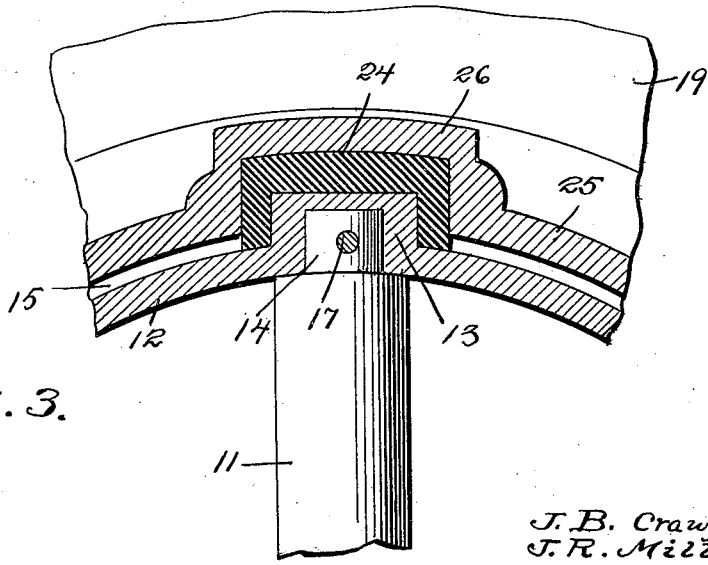
Witnesses
Inventors
J. B. Crawford.
J. R. Milliken.
By
Attorneys.
COLUMBIA PLANOGRAPH CO., WASHINGTON, D. C.

UNITED STATES PATENT OFFICE.

JAMES B. CRAWFORD AND JAMES R. MILLIKEN, OF SIOUX CITY, IOWA.

METALLIC TIRE.

1,005,607.  Specification of Letters Patent.  Patented Oct. 10, 1911.

Application filed January 24, 1911. Serial No. 604,451.

*To all whom it may concern:*

Be it known that we, JAMES B. CRAWFORD and JAMES R. MILLIKEN, citizens of the United States, residing at Sioux City, in the county of Woodbury and State of Iowa, have invented certain new and useful Improvements in Metallic Tires, of which the following is a specification.

This invention relates to resilient tires, and has for an object to provide an improved tire of this nature which is made substantially wholly of metal.

Another object of the invention is to so peculiarly construct the tire that it has the outward appearance and size of the pneumatic tire, now commonly used, so that it can be applied to wheels of common form and operated in conjunction with motor vehicles of common construction.

The invention further contemplates a metallic resilient tire which will support loads of considerable weight, the loads varying in weight to a reasonable extent, and which will flex, or have a cushioning action, when the tire passes over obstacles tending to jar the vehicle carrying the tire.

For a full understanding of the invention and the merits thereof and also to acquire a knowledge of the details of construction, reference is to be had to the following description and accompanying drawings, in which:

Figure 1 is a side elevation of the improved tire as applied to a wheel and being shown partly in section; Fig. 2 is a transverse section through the tire taken on the line 2—2 of Fig. 1; Fig. 3 is a longitudinal section of the tire taken on the line 3—3 of Fig. 2; and, Fig. 4 is a transverse section taken through the tire on the line 4—4 of Fig. 1.

Corresponding and like parts are referred to in the following description and indicated in all the views of the drawing by the same reference characters.

Referring to the drawing, 10 designates the hub of a wheel having radiating spokes 11 of the usual form.

The invention comprehends a rim or felly 12 having a plurality of spaced transverse ribs 13 across its outer face provided with central openings terminating through the rim 12 for the reception of the tenons 14 of the spokes 11. As will be observed from Figs. 1 and 3, the ribs or blocks 13 are angular in cross section, and are positioned one at the end of each of the spokes 11. The rim 12 is provided at one edge, for the purpose of description the inner edge, with an integral outstanding flange 15. A detachable locking flange 16 is positioned against the outer edge of the rim 12 in parallelism with the flange 15, and is held in place by rivets or bolts 17. The members 17 pass edgewise through the rim 12 and through the flange 16 at their outer ends, the same engaging at their central portions through the spoke-tenons 14 to hold the latter firmly in the blocks 13.

The body of the tire comprises two pairs of spring plates 18 and 19 of circular or ring form. The plates of each pair are bulged longitudinally and midway of their edges out from one another, providing a longitudinal dead air channel at each side of the tire. The bulging of the plates also provides spring members for the body of the tire. The plates 18 bulge outwardly over the flanges 15 and 16, while the plates 19 bulge inward toward one another but do not contact except when under excessive pressure, to admit of the free action of the plates. The inner faces of the plates 18 and 19, at their edges, are brought together and suitably secured in such position, as by welding, riveting or the like, the inner edges of the plates 18 and 19 seating against the inner faces of the flanges 15 and 16 but being spaced outwardly from the rim 12. The inner edges of the plates 18 and 19 are raised at points registering with the blocks 13, and are spaced about the same.

A channel member 20, comprising a flat circular band having outturned flanges at its opposite edges, is disposed between the outer edges of the plates 18 and 19 and held in such position by transverse rivets 21 passing through the plates and the flanges of the channel member 20. The tread 22, of rubber or like cushioning material, is fitted in the channel 20 and held therein by transverse rivets 23 passing through the plates, the channel member 20, and the tread 22.

A cushion 24, comprising a block of rubber, or the like, engages over the blocks 13 and beneath the inner edges of the plates 18 and 19. A spacing strip 25 is disposed between the inner edges of the plates 18 and 19, between each pair of the same so as to space the plates at the opposite sides of the body of the tire. The spacing strip 25 is welded, or otherwise suitably secured in place so as to form a fixed part of the body of the tire. The spacing strip 25 is arched outwardly, as at 26 to conform to the inner edges of the plates at their cutaway or depressed portions, the strip 25 being thus spaced out from the rim 12 and the block 13 to admit of a limited play of the body portion about the rim. The inner edges of the plates 18 and 19 fit loosely against the inner sides of the flanges 15 and 16 to admit of the compression or sliding movement of the plates between the flanges.

The operation of the device is apparent since during the rotation of the wheel, if the tread 22 strikes an obstruction the plates 18 and 19 are compressed to spring the bulged portions thereof outwardly from one another and take up the shock incident to the jar received by the tread 22. At the same time the cushion 24 is compressed and the spacing strip 25 approaches the rim 12, absorbing a considerable amount of the shock. The cushioning block 24 is chiefly employed in deadening the noise incident to the running of the wheel.

It will be of course understood that the rim 12 may be positioned over the felly of an ordinary wheel, in which case the spokes 11 would not engage in the blocks 13. The structure otherwise would be substantially the same.

The device is so formed that it can be applied to wheels of common construction, presenting the resilient tire which conforms to a large extent to the shape and size of the pneumatic tire which is now used.

Having thus described the invention, what is claimed is:

1. A metallic tire including a rim having an outstanding flange at its inner edge and having spaced transverse blocks upon its outer face, pairs of oppositely bulged spring plates engaging in spaced relation about the rim and having cutaway portions loosely receiving the blocks, a spacing strip secured to the inner edges of the plates for holding the pairs in spaced relation, the spacing strip being arched upwardly to loosely engage over the blocks, a cushion seated over the blocks beneath the spacing strip, a channel member carried between the outer edges of the pairs of plates, and a tread seated in the channel member.

2. A metallic tire including a yielding body portion having a spacing strip at its inner side provided with outwardly arched portions, a supporting rim for the body portion having an outturned flange at one edge engaging against the side of the body portion and having transverse blocks fitting loosely in the outwardly arched portions of the strip, and a detachable flange carried against the free edge of the supporting rim for holding the body in position.

3. A metallic tire including oppositely bulged spring plates, a spacing strip engaging between the inner edges of the plates to hold the same in spaced pairs, a channel member engaging between the outer edges of the pairs of plates, a tread carried in the channel member, a supporting rim spaced inwardly from the spacing strip and having transverse blocks and being provided with an outturned flange at one edge for engagement against the adjacent spring plate, cushions interposed between the blocks and the spacing strip, and a detachable flange seating against the opposite outer spring plate and the free edge of the rim.

4. A metallic tire including a body portion comprising spring plates, a tread carried between the outer edges of the spring plates, a spacing strip carried between the inner edges of the plates and having spaced arched portions, a supporting rim disposed in spaced relation inwardly of the spacing strip and having an outturned flange engaging against the side of the body, cushion blocks carried between the supporting rim and the spacing strip in said arched portions, and a detachable flange carried against the opposite edge of the supporting rim for engagement against the opposite side of the body.

5. A metallic tire comprising a supporting rim having an outturned flange at one edge and spaced transverse blocks upon its outer face, spring members carried about the rim and having recesses for the reception of said blocks, a spacing strip engaging between the inner edges of the spring members to hold the same apart, a tread carried between the outer edges of the spring members, and a detachable flange carried against the opposite edge of the rim for holding the spring members thereon.

In testimony whereof, we affix our signatures in presence of two witnesses.

JAMES B. CRAWFORD. [L. S.]
JAMES R. MILLIKEN. [L. S.]

Witnesses:
  JNO. R. CARTER,
  HOMER B. CARTER.

---

Copies of this patent may be obtained for five cents each, by addressing the "Commissioner of Patents, Washington, D. C."